United States Patent [19]

Zecher et al.

[11] Patent Number: 4,908,430

[45] Date of Patent: Mar. 13, 1990

[54] USE OF SPECIAL POLYIMIDES AS CAST FILMS AND COATINGS

[75] Inventors: Wilfried Zecher, Leverkusen; Dieter Arlt, Cologne; Lutz Schrader, Krefeld; Werner Waldenrath, Cologne, all of Fed. Rep. of Germany

[73] Assignee: Bayer Aktiengesellschaft, Leverkusen, Fed. Rep. of Germany

[21] Appl. No.: 189,211

[22] Filed: May 2, 1988

[30] Foreign Application Priority Data

May 13, 1987 [DE] Fed. Rep. of Germany ....... 3715891

[51] Int. Cl.$^4$ .............................................. C08G 69/26
[52] U.S. Cl. .................................. 528/353; 528/125; 528/126; 528/172; 528/176
[58] Field of Search ............... 528/353, 125, 126, 172, 528/176

[56] References Cited

U.S. PATENT DOCUMENTS 3,234,181 2/1966 Olivier ................................ 528/353
4,696,994 9/1987 Nakajima et al. .................... 528/176

OTHER PUBLICATIONS

Patent Abstracts of Japan, Band 10, Nr. 230 (C-365)[2286], 1986; & JP-A-61 64 730 (Sumitomo Bakelite Co., Ltd.) 1986.
Patent Abstracts of Japan, Band 10, Nr. 350 (C-387)[2406], 1986; & JP-A-61 151 237 (Ube Ind. Ltd.) 1986.
Patent Abstracts of Japan, Band 11, Nr. 89 (C-411)[2536], 1986; & JP-A-61 241 360 (Nitto Electric Ind. Co., Ltd.) 1986.

*Primary Examiner*—John Kight
*Assistant Examiner*—M. L. Moore
*Attorney, Agent, or Firm*—Connolly and Hutz

[57] ABSTRACT

This invention relates to the use of new special polyimides for the production of cast films and coatings.

7 Claims, No Drawings

USE OF SPECIAL POLYIMIDES AS CAST FILMS AND COATINGS

This invention relates to the use of new special polyimides for the production of cast films and coatings.

Polyimides are obtained, for example, by reaction of pyromellitic dianhydride with 4,4'-diaminodiphenylether (DE-PS 1 202 981) and are used in particular as temperature-resistant films and moldings. One disadvantage of these polyimides is that shaping or forming has to be carried out via the polyamido acid from the solvent because the polyimides are insoluble in almost every solvent, in addition to which these materials are not thermoplastic.

It has now been found that polyimide resins, which may be cast from solutions to form films or coatings, can be obtained by reaction of 2,2-bisphthalic anhydrido-(4)-propane with 2,2-bis-[4-aminophenoxyphenyl]-propane at temperatures of 0° to 400° C. and preferably at temperatures of 10° to 250° C. and preferably in a solvent.

The properties of the polyimides used according to the invention must be regarded as surprising because, in general, the reaction products of tetracarboxylic dianhydrides and aromatic diamines are precipitated as jelly-like or solid masses from the solvents used for the imidization, for example N-methylpyrrolidone, so that they can then no longer be processed on an industrial scale or lead to materials of which the properties, for example elasticity, are seriously impaired. By contrast, the polyimides used according to the invention form stable solutions not only in aprotic solvents, such as N-methylpyrrolidone and dimethylacetamide, but also in less polar solvents and may be fully condensed in this phase and then worked up.

The polyimide resins used according to the invention may cast, for example, from methylene chloride to form films and coatings under very much simpler technical conditions than is the case in the processing of polyamido acids from aprotic solvents.

The tetracarboxylic acid dianhydride used in this invention is 2,2-bisphathalic anhydrido-(4)-propane (I)

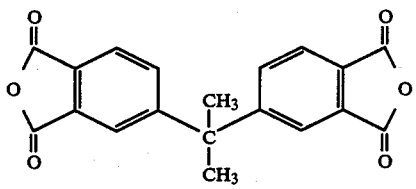

which may be obtained, for example, by oxidation of 2,2-bis-[1,2-dimethylphenyl-(4)]-propane. Instead of using the anhydride, it is also possible to use such derivatives as the alkyl or aryl semiesters, alkyl or aryl esters, amides or the free tetracarboxylic acid.

The diamine reacted in this invention is 2,2-bis-[4-aminophenoxyphenyl]-propane (II)

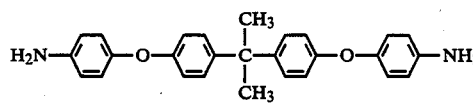

which may be further substituted, for example by alkyl or halogen. Instead of the diamine, derivatives such as, for example, the acetyl compounds, isocyanates or carbamic acid esters may also be used for the reaction according to the invention.

The diamine in this invention may be prepared, for example, by catalytic hydrogenation of 2,2-bis-[4-nitrophenoxyphenyl]-propane.

Molecular weight may be regulated, for example, with monobasic carboxylic acids, such as acetic acid, lauric acid, stearic acid, benzoic acid and phenylacetic acid, monofunctional acid anhydrides, such as phthalic anhydride, tetrachlorophthalic anhydride and phenylphthalic anhydride and hexahydrophthalic anhydride, and monofunctional amines, such as butylamine, dodecylamine, octadecylamine, cyclohexylamine, benzylamine, aniline and dodecyl aniline, derivatives and mixtures thereof.

The reaction may be carried out in the melt or preferably in solvents. Suitable solvents are (halogenated) hydrocarbons, phenols, alcohols, esters, lactones, ketones, ethers, nitriles, amides, sulfoxides and sulfones, for example nitrobenzene, chlorobenzene, o-dichlorobenzene, methylene chloride, trichloroethylene, pyridine, phenol, o-, m-, p-cresol, caprolactone, acetophenone, cyclohexanone, diethylene glycol dimethyl ether, benzonitrile, dimethylacetamide, caprolactam, N-methyl caprolactam, N-methylpyrrolidone, N-cyclohexylpyrrolidone, dimethylsulfone and tetramethylene sulfone or mixtures thereof.

To prepare the polyimides used according to the invention, the reaction components are held at temperatures of 0° to 400° C. for a few minutes to several hours with or without a solvent. The course of the reaction may be followed, for example, from the IR spectra and from the elimination of water.

The reaction may also be carried out continuously.

Polyimides according to the invention having a relative viscosity, as measured on a 1% solution in m-cresol at 25° C., of 1.0 to 4.0 and preferably of 1.5 to 2.2 have proved to be particularly suitable.

In some cases, it is of advantage to carry out the production reaction in several stages or to add the individual components in a different sequence or at different temperatures. Thus, the polyamido acid formed in the first stage may be prepared at temperatures around 20° C. and then converted into the polyimide at higher temperatures, optionally in vacuo or with azeotropic distillation. In addition, the imidization may also be carried out by other suitable methods, such as chemically, for example by the action of acetic anhydride or acetic anhydride and pyridine or carbodiimides.

In one preferred embodiment, the polyimide or the polyamido acid is prepared in a solvent, concentrated in the reaction vessel itself to form a free-flowing solution or a fusible resin and the remaining solvent subsequently evaporated, optionally with post-condensation and imidization, in an evaporation extruder, optionally in vacuo, at temperatures of 250° to 400° C. and preferably at temperatures of 300° to 360° C.

In another embodiment, the polyimide is prepared in a solvent and worked up by precipitation, for example with water or methanol.

In general, one val amine is reacted per val acid anhydride, although significant deviations from these quantitative ratios are also possible.

In other possible embodiments, the bisphthalic anhydridopropane according to the invention is mixed with suitable tetracarboxylic dianhydrides, tri- or dicarboxylic acids and the bis-[aminophenoxyphenyl]-propane with suitable diamines.

The quantitative ratios are selected so that, where they are used as a cast film or coating, the polymers obtained are still soluble in solvents, such as methylene chloride for example. In this case, the proportion of these polycarboxylic acids may be 2 to 70 val-% and the proportion of diamines likewise 2 to 70 val-%, based on the anhydrides and amines according to the invention.

Suitable polycarboxylic acids are, for example, pyromellitic dianhydride, diphenyltetracarboxylic dianhydride, benzophenone tetracarboxylic dianhydride, cyclopentane tetracarboxylic dianhydride, trimellitic anhydride, terephthalic acid, isophthalic acid, adipic acid, azelaic acid and sebacic acid. Suitable diamines are, for example, 1,6-diaminohexane, 1,12-diaminododecane, 1,3- and 1,4-diaminocyclohexane, m- and p-phenylenediamine, bis-[4-aminocyclohexyl]-methane and amines corresponding to the following general formula

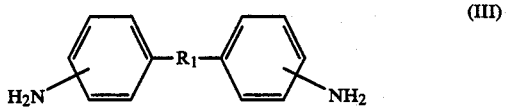

(III)

in which $R_1$ represents for example the following radicals

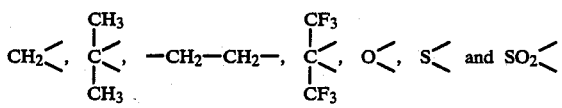

and which may be further substituted by halogen and alkyl radicals. 4,4'-diaminodiphenylether and m-phenylenediamine are preferably used for mixing.

The preparation of the polymers used according to the invention may be influenced by catalysts, for example by amines, such as triethylamine, 1,4-diazabicyclo-(2,2,2)-octane, 2-methyl imidazole and pyridine, by inorganic and organic metal compounds, such as compounds of iron, lead, zinc, tin, copper, cobalt, nickel and titanium, for example cobalt acetate, lead oxide, dibutyl-tin dilaurate, copper acetyl acetonate, nickel acetate, alkali phenolates and sodium cyanide, by boron derivatives, such as boric acid, and by phosphorus compounds, such as trialkylphosphine, methyl phospholine oxide, triphenylphosphite, triphenylphosphate and polyphosphoric acid. Pyridine, boric acid, triphenylphosphite and triphenylphosphate are preferably used.

The cast films and coatings according to the invention are distinguished by particular elasticity and a high deflection temperature under load. Their properties may be varied for various applications by changing the stoichiometric ratios, the degree of condensation and by the incorporation of low molecular weight and high molecular weight components, such as fillers, carbon blacks, dyes, antiagers, lubricants, plasticizers and other polymers.

The following abbreviations are used in the Examples: BPAP for 2,2-bisphthalic anhydrido-(4)-propane and BAPP for 2,2-bis-[4-aminophenoxyphenyl]-propane.

Unless otherwise indicated, the relative viscosity is measured on 1% solutions in m-cresol at 25° C.

EXAMPLE 1

80.36 g 2,2-bis-[4-aminophenoxyphenyl]-propane (BAPP) and 1.48 g dodecylamine are dissolved in 430 g N-methylpyrrolidone. 67.2 g 2,2-bisphthalic anhydrido-(4)-propane (BPAP) are then introduced with cooling at 15 to 20° C. The solution is stirred for 6 hours at room temperature. 250 g toluene are then added, an esterification attachment fitted and the temperature increased to the reflux temperature. The water formed during the reaction is distilled off azeotropically in about 3 hours and separated off through the esterification attachment. The esterification attachment is then replaced by a distillation bridge and the toluene distilled off. The reaction mixture is then stirred for about 6 hours at 180° C., vacuum being repeatedly applied until distillation begins.

The polyimide is obtained in the form of a light brown viscous solution. A sample of this solution is coated onto a glass plate and baked for 15 minutes at 200° and 300° C. to form a clear elastic film. Thermogravimetric analysis reveals a glass transition temperature Tg of 222° C. The relative viscosity of a 1% solution of this film in m-cresol at 25° C. [$\eta_{rel}^{25}$] measures 1.52.

EXAMPLE 2

160.7 g BAPP and 2.96 g dodecylamine are dissolved in 900 g m-cresol 70, a technical mixture of 70% m- and 30% p-cresol. 134.4 g BPAP are then introduced with cooling at 15° to 20° C. A viscous solution is obtained and is stirred first for 4 hours at room temperature and then for 2 hours at 120° C., for 2 hours at 150° C., for 2 hours at 180° C. and for 2 hours at 190° C.

To remove water, a vacuum is repeatedly applied during the reaction for distillation. The reaction mixture is cooled, diluted with 1 kg methylene chloride and precipitated in methanol. The precipitate is dried, dissolved in dimethylacetamide and reprecipitated in methanol. The polyimide is obtained in the form of white beads which are dried in a water jet vacuum at a temperature slowly increasing to 200° C. The relative viscosity of a 1% solution in m-cresol $\eta_{rel}^{25}$ is 1.66.

The polyimide thus prepared is dissolved in methylene chloride to a solids content of approximately 10% by weight and cast at approximately 30° C. in a laboratory drum casting machine to form a clear elastic film. These films have a tear strength of 60N/mm², a yield point of 67N/mm² and a thermal stability under load according to VDE of 230° C.

EXAMPLE 3

642.8 g BAPP, 11.84 g dodecylamine and 537.6 g BPAP are reacted in 3500 g m-cresol under the reaction conditions of Example 2. A light brown solution of the polyimide having a solids content of approximately 25% by weight and a viscosity $\eta_{rel}^{25}$ of 68 400 mPa.s is obtained.

The polyimide solution thus prepared is concentrated in a ZSK evaporation extruder at a maximum jacket temperature of 330° C. and under a pressure of 10 mbar and subsequently granulated. A transparent, elastic resin having a relative viscosity $\eta_{rel}^{25}$ of 1.62, as measured on a 1% solution in cresol, is obtained.

| $C_{46}H_{34}H_2O_6$ (710) | C | H | N |
|---|---|---|---|
| Calculated: | 77.8 | 4.8 | 3.9% |

-continued

| $C_{46}H_{34}H_2O_6$ (710) | C | H | N |
|---|---|---|---|
| Found: | 77.4 | 5.1 | 3.8% |

A sample of the granulate is dissolved in m-cresol, coated onto a glass plate and baked for 15 minutes at 200° and 300° C. to form a clear elastic lacquer film. Another sample is dissolved in methylene chloride, coated onto a metal plate and the solvent evaporated first at room temperature and then at 90° C. A transparent elastic lacquer film is obtained.

EXAMPLE 4

40.18 g BAPP and 0.74 g dodecylamine are dissolved in 260 g N-cyclohexylpyrrolidone. 33.6 g BPAP are then introduced at 15° to 20° C., followed by stirring for 3 hours at that temperature. The temperature is then increased to 160° C. over a period of 6 hours in a water jet vacuum and the reaction completed under reflux in about 3 hours. A viscous solution of the polyimide is obtained and, after dilution with dimethylacetamide, is added dropwise to methanol. The polyimide precipitates in the form of white beads. The relative viscosity $\eta_{rel}^{25}$ is 1.71, as measured at 25° C. on a 1% solution in m-cresol.

A sample of the polyimide is dissolved in m-cresol, coated onto a metal plate and baked for 15 minutes at 200° C. and at 300° C. to form a clear elastic lacquer film.

EXAMPLE 5

The reaction is carried out under the conditions of Example 4, but in 300 g tetramethylene sulfone as solvent. Precipitation in methanol produces a colorless polyimide having a relative viscosity $\eta_{rel}^{25}$ of 1.87, as measured on a 1% solution in m-cresol.

The polyimide thus prepared is dissolved in methylene chloride, coated onto a glass plate and, after evaporation of the solvent at room temperature, heated for 15 minutes to 90° C. and then for 15 minutes to 200° C. A transparent, elastic film is obtained.

EXAMPLE 6

40.18 g BAPP and 0.74 g dodecylamine are dissolved in 300 g chlorobenzene in a stirred flask fitted with an esterification attachment. 33.6 g BPAP are then introduced at room temperature and the reaction mixture stirred for 6 hours at room temperature. The reaction mixture is then heated for 7 hours to the reflux temperature. The water formed during the reaction is separated off through the esterification attachment. The reaction product, a clear viscous solution, is diluted with dimethylacetamide after cooling and added dropwise to acetonitrile. The polyimide is obtained in the form of white beads having a relative viscosity $\eta_{rel}^{25}$ of 1.92.

A solution of the polyimide in chlorobenzene is concentrated by evaporation at 130° to 250° C. on a glass plate to form a clear elastic lacquer film.

EXAMPLE 7

40.18 g BAPP, 0.74 g dodecylamine and 33.6 g BPAP are reacted in 300 g o-dichlorobenzene in the same way as in Example 6. A highly viscous solution of the polyimide is obtained, showing the IR bands characteristic of imides at 1725 and 1780 cm$^{-1}$.

The solution of the polyimide is diluted with o-dichlorobenzene, coated onto a glass plate and baked for 15 minutes at 180° C. and at 300° C. to form a transparent elastic lacquer film.

EXAMPLE 8

40.18 g BAPP, 10.58 g m-phenylenediamine and 0.74 g aniline are dissolved in 450 g m-cresol. 67.2 g BPAP are then introduced at 15° to 20° C. The mixture changes into a highly viscous solution over a period of 6 hours at room temperature. It is then heated for 6 hours to the reflux temperature in a reflux condenser held at 140° C. The reaction mixture is cooled, diluted with methylene chloride in a ratio of 1:1 and precipitated in methanol. The polyimide is obtained in the form of white beads having a relative solution viscosity $\eta_{rel}^{25}$ of 1.85.

A solution of the polyimide in m-cresol is applied to a test plate and baked for 15 minutes at 200° C. and at 300° C. to form a transparent elastic lacquer film.

EXAMPLE 9

22.96 g BAPP, 15.12 g m-phenylenediamine and 0.74 g aniline are reacted with 67.2 g BPAP in 400 g m-cresol in the same way as in Example 8.

A solution of the polyimide in cresol having a solids content of 20% by weight and a viscosity $\eta_{rel}^{25}$ of 108 000 mPa.s is obtained.

The solution of the polyimide is coated onto a glass plate and baked for 15 minutes at 200° C. and at 300° C. to form a clear lacquer film.

EXAMPLE 10

80.36 g BAPP, 0.74 g aniline and 67.2 g BPAP are reacted in 560 g m-cresol in the same way as in Example 8. An approximately 20% solution of the polyimide in cresol having a viscosity of 318 000 mPa.s is obtained. The solution is diluted with methylene chloride and the polyimide precipitated by dropwise addition to methanol. The solution viscosity of the polyimide $\eta_{rel}^{25}$ is 2.01, as measured on a 1% solution in m-cresol.

A solution of the polyimide in methylene chloride is applied to a glass plate and concentrated by evaporation at room temperature to form a clear elastic film.

I claim:

1. Cast films or coatings comprising polyimide resins prepared by the reaction of 2,2-bisphthalic anhydrido-(4)-propane with 2,2-bis-(4-aminophenoxyphenyl)-propane, at temperatures of 0° to 400° C. and optionally in the presence of further diamines, acids or anhydrides.

2. Coast films or coatings according to claim 1, characterized in that the reaction is carried out at temperatures of 10° C. to 250° C.

3. Cast films or coatings according to claim 1, characterized in that, in a first step, the polyimides are prepared in a solvent and then concentrated, optionally in vacuo, and optionally fully condensed in an evaporation extruder at temperatures of 250° C. to 400° C.

4. Cast films or resins according to claim 1, characterized in that, in a first step, the polyimides are prepared in a solvent and then precipitated with a non-solvent.

5. Cast films or resins according to claim 1, characterized in that the 2,2-bisphthalic anhydrido-propane is reacted in admixture with other polycarboxylic acid anhydrides and/or the 2,2-bis-(4-aminophenoxyphenyl)-propane in admixture with other diamines at temperatures of 0° to 400° C.

6. A process for the production of cast films and coatings of the polyimide resins according to claim 1, comprising casting a solution of the polyimide resins in a solvent.

7. A process as claimed in claim 5, comprising casting a solution in a solvent having a boiling point below 150° C.

* * * * *